United States Patent
Lee et al.

(10) Patent No.: US 12,457,567 B2
(45) Date of Patent: Oct. 28, 2025

(54) METHOD OF DETERMINING MEASUREMENT REQUIREMENTS ON HIGHER PRIORITY CARRIERS

(71) Applicant: Nokia Technologies Oy, Espoo (FI)

(72) Inventors: Gilsoo Lee, Naperville, IL (US); Jurgen Hofmann, Merching (DE); Hyun-Su Cha, Naperville, IL (US)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 19/051,431

(22) Filed: Feb. 12, 2025

(65) Prior Publication Data
US 2025/0317871 A1    Oct. 9, 2025

(30) Foreign Application Priority Data
Apr. 4, 2024 (GB) ..................................... 2404793

(51) Int. Cl.
*H04W 76/28* (2018.01)
*H04W 52/02* (2009.01)
*H04W 52/36* (2009.01)

(52) U.S. Cl.
CPC ..... *H04W 52/367* (2013.01); *H04W 52/0225* (2013.01)

(58) Field of Classification Search
CPC ... H04W 76/28; H04W 76/27; H04W 72/231; H04W 16/28; H04W 76/38
See application file for complete search history.

(56) References Cited

U.S. PATENT DOCUMENTS

2021/0068012 A1    3/2021    Kim et al.

FOREIGN PATENT DOCUMENTS

| CN | 115735377 A | * | 3/2023 | ........... H04B 17/328 |
| KR | 20180103104 A |  | 9/2018 | |

OTHER PUBLICATIONS

ZTE Corporation, "Discussion on impacts to RRM core requirements for Enhanced RedCap," 3GPP TSG-RAN WG4 Meeting #110, R4-2401983, Feb. 26- Mar. 1, 2024, Athens, GR.
Nokia et al., "RRM Core Requirements for Enhanced RedCap," 3GPP TSG-RAN WG4 Meeting #110, R4-2402727, Feb. 26-Mar. 1, 2024, Athens, GR.
Pavuluri, M. et al., "Superimposed Pilot Based Channel Estimation for MIMO Coded FBMC Systems," 2021 National Conference on Communications (NCC).

* cited by examiner

*Primary Examiner* — Tu X Nguyen
(74) *Attorney, Agent, or Firm* — McCarter & English, LLP

(57) ABSTRACT

The present disclosure provides a terminal device. The terminal device can receive a first parameter for the terminal device, wherein a first carrier is used by the terminal device. The terminal device can perform a comparison between the first parameter and one or more thresholds, and determine a second parameter for the terminal device based on the comparison. The second parameter can indicate a time interval for the terminal device to search for one or more carriers with a priority higher than the first carrier. The terminal device can receive the first parameter from a network device.

16 Claims, 6 Drawing Sheets

METHOD OF DETERMINING MEASUREMENT REQUIREMENTS ON HIGHER PRIORITY CARRIERS

RELATED APPLICATION

This application claims priority to, and the benefit of, GB Application No. 2404793.8, filed on Apr. 4, 2024, the contents of which is incorporated herein by reference in its entirety.

FIELD

Example embodiments of the present disclosure generally relate to the field of communications, and in particular, to devices, methods, apparatuses and a computer readable storage medium for determining measurement requirements on higher priority carriers.

BACKGROUND

In communication systems such as New Radio (NR) or Long Term Evolution (LTE) systems, a reduced capability (RedCap) user equipment (UE) may need to search for one or more carriers with a priority higher than the carrier it is currently using. If the RedCap UE uses an extended or relaxed time period to search every higher priority carriers, it may take a longer time to measure, detect, and evaluate the higher priority carriers. Therefore, it may have a negative impact on the performance or scheduling capability of the network. On the other hand, if an extended time period is set to search higher priority carriers, it may be beneficial to save the power and energy consumption of the RedCap UE. Thus, a tradeoff between the performance of the network and power and energy consumption of the RedCap UE may be considered to define a requirement on the measurement on higher priority carriers.

Therefore, it would be desirable to have a solution that takes into account at least some of the issues discussed above, as well as other possible issues.

SUMMARY

In general, example embodiments of the present disclosure relate to determining measurement requirements on higher priority carriers.

In a first aspect, there is provided a terminal device. The terminal device comprises at least one processor and at least one memory storing instructions that, when executed by the at least one processor, cause the terminal device to at least: receive a first parameter for the terminal device, wherein a first carrier is used by the terminal device; perform a comparison between the first parameter and one or more thresholds; and determine a second parameter for the terminal device based on the comparison, the second parameter indicating a time interval for the terminal device to search for one or more carriers with a priority higher than the first carrier.

In a second aspect, there is provided a network device. The network device comprises at least one processor and at least one memory storing instructions that, when executed by the at least one processor, cause the network device to at least: determine a first parameter for a terminal device, wherein a first carrier is used by the terminal device; perform a comparison between the first parameter and one or more thresholds; and determine a second parameter for the terminal device based on the comparison, the second parameter indicating a time interval for the terminal device to search for one or more carriers with a priority higher than the first carrier.

In a third aspect, there is provided a method. The method comprises receiving a first parameter for a terminal device, wherein a first carrier is used by the terminal device; performing a comparison between the first parameter and one or more thresholds; and determining a second parameter for the terminal device based on the comparison, the second parameter indicating a time interval for the terminal device to search for one or more carriers with a priority higher than the first carrier.

In a fourth aspect, there is provided a method. The method comprises determining a first parameter for a terminal device, wherein a first carrier is used by the terminal device; performing a comparison between the first parameter and one or more thresholds; and determining a second parameter for the terminal device based on the comparison, the second parameter indicating a time interval for the terminal device to search for one or more carriers with a priority higher than the first carrier.

In a fifth aspect, there is provided an apparatus. The apparatus comprises means for receiving a first parameter for a terminal device, wherein a first carrier is used by the terminal device; means for performing a comparison between the first parameter and one or more thresholds; and means for determining a second parameter for the terminal device based on the comparison, the second parameter indicating a time interval for the terminal device to search for one or more carriers with a priority higher than the first carrier.

In a sixth aspect, there is provided an apparatus. The apparatus comprises means for determining a first parameter for a terminal device, wherein a first carrier is used by the terminal device; means for performing a comparison between the first parameter and one or more thresholds; and means for determining a second parameter for the terminal device based on the comparison, the second parameter indicating a time interval for the terminal device to search for one or more carriers with a priority higher than the first carrier.

In a seventh aspect, there is provided a non-transitory computer readable medium comprising program instructions for causing an apparatus to perform at least the method according to any one of the above third and fourth aspects.

It is to be understood that the summary section is not intended to identify key or essential features of embodiments of the present disclosure, nor is it intended to be used to limit the scope of the present disclosure. Other features of the present disclosure will become easily comprehensible through the following description.

BRIEF DESCRIPTION OF THE DRAWINGS

Some example embodiments will now be described with reference to the accompanying drawings, in which.

Throughout the drawings, the same or similar reference numerals represent the same or similar elements.

DETAILED DESCRIPTION

Figure 1:
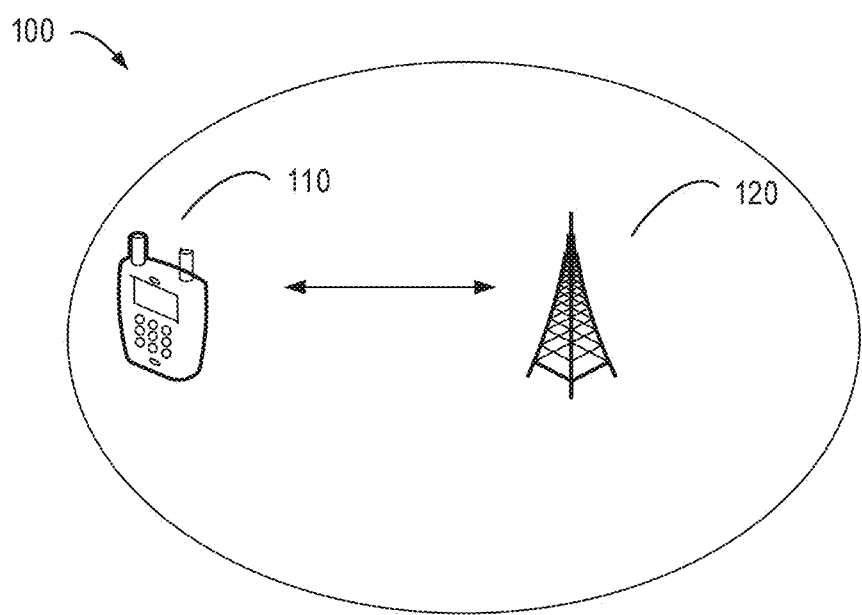
FIG. 1 illustrates an example of a network environment in which example embodiments of the present disclosure can be implemented.

Principles of the present disclosure will now be described with reference to some example embodiments. It is to be understood that these embodiments are described only for the purpose of illustration and help those skilled in the art to understand and implement the present disclosure, without suggesting any limitation as to the scope of the disclosure. The disclosure described herein can be implemented in various manners other than the ones described below.

In the following description and claims, unless defined otherwise, all technical and scientific terms used herein have the same meaning as commonly understood by one of ordinary skills in the art to which this disclosure belongs.

References in the present disclosure to "one embodiment," "an embodiment," "an example embodiment," and the like indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

It shall be understood that although the terms "first" and "second" etc. may be used herein to describe various elements, these elements should not be limited by these terms. These terms are only used to distinguish one element from another. For example, a first element could be termed a second element, and similarly, a second element could be termed a first element, without departing from the scope of example embodiments. As used herein, the term "and/or" includes any and all combinations of one or more of the listed terms.

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof. As used herein, "at least one of the following: <a list of two or more elements>" and "at least one of <a list of two or more elements>" and similar wording, where the list of two or more elements are joined by "and" or "or", mean at least any one of the elements, or at least any two or more of the elements, or at least all the elements.

As used in this application, the term "circuitry" may refer to one or more or all of the following:
(a) hardware-only circuits (such as in analog and/or digital circuits) and
(b) combinations of hardware circuits and software, such as (as applicable):
 (i) a combination of analog and/or digital hardware circuit(s) with software (e.g., firmware); and
 (ii) any portions of hardware processor(s) with software (including digital signal processor(s)), software, and memory(ies) that work together to cause an apparatus, such as a mobile phone or server, to perform various functions) and
(c) hardware circuit(s) and or processor(s), such as a microprocessor(s) or a portion of a microprocessor(s), that requires software (for example, firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

As used herein, the term "cellular network" refers to a network operating in accordance with any suitable radio access technology defined by standards, such as Long Term Evolution (LTE), LTE-Advanced (LTE-A), new radio Wideband Code Division Multiple Access (WCDMA), High-Speed Packet Access (HSPA), Narrow Band Internet of Things (NB-IoT) and so on. Furthermore, the communications between a terminal device and a network device of a cellular network may be performed according to any suitable communication protocols, including, but not limited to, the fourth generation (4G), 4.5G, the future fifth generation (5G) communication protocols, and/or any other protocols either currently known or to be developed in the future. Embodiments of the present disclosure may be applied in various cellular networks. Given the rapid development in communications, there will of course also be future type communication technologies and systems with which the present disclosure may be embodied. It should not be seen as limiting the scope of the present disclosure to only the aforementioned system.

As used herein, the term "network device" refers to any device in a cellular network via which a terminal device accesses a data network and receives services exposed by other network devices of the cellular network. In some examples, a network device may comprise or implement a network function of a 5th generation communication system (5GS) (e.g., a core network) of a cellular network. In some examples, the network devices may be located at the RAN of the 5GS. The network device may be part of a satellite, a base station (BS) or an access point (AP), for example, a node B (NodeB or NB), an evolved NodeB (eNodeB or eNB), a NR NB (also referred to as a gNB), a Remote Radio Unit (RRU), a radio header (RH), a remote radio head (RRH), a relay, a low power node such as a femto, a pico node, and so forth, depending on the applied terminology and technology. A gNB may include a centralized unit CU and one or more distributed DUs. Femto and Pico nodes are small base stations with a small coverage area.

The term "terminal device" refers to a device of a communication system of a cellular network, such as a 5th generation communication system (5GS) that may be capable of wireless (e.g., radio) communication with a NR-RAN of the 5GS). By way of example rather than limitation, a terminal device may also be referred to as a wireless communication device, user equipment (UE), a Subscriber Station (SS), a Portable Subscriber Station, a Mobile Station (MS), or an Access Terminal (AT). Examples of a terminal device include, but not limited to, a mobile phone, a cellular phone, a smart phone, voice over IP (VOIP) phones, wireless local loop phones, a tablet, a wearable terminal device, a personal digital assistant (PDA), portable computers, desktop computer, image capture terminal devices such as digital cameras, gaming terminal devices, music storage and playback appliances, vehicle-mounted wireless terminal devices, wireless endpoints, mobile stations, laptop-embedded equipment (LEE), laptop-mounted equipment (LME), USB dongles, smart devices, wireless customer-premises equipment (CPE), an Internet of Things (IoT) device, a watch or other wearable, a head-mounted display (HMD), a vehicle, a drone, a medical device and applications (for example, remote surgery), an industrial device and applications (for example, a robot and/or other wireless devices operating in an industrial and/or an automated processing chain contexts), a consumer electronics device, a device operating on commercial and/or industrial wireless networks, and the like. In the following description, the terms "terminal device", "communication device", "terminal", "user equipment" and "UE" may be used interchangeably.

FIG. 1 illustrates an example of a network environment 100 in which example embodiments of the present disclosure can be implemented. The environment 100 may be a part of a communication network and comprise a plurality of terminal devices and network devices, such as a terminal device 110, a network device 120. As an example, the terminal device 110 may be implemented as a User Equipment (UE) or a reduced capability (RedCap) UE, and the network device 120 may be implemented as an eNB, gNB or a base station (BS). The network device 120 may transmit various data to the terminal device 110 via network environment 100.

To transmit data and/or control information, the terminal device 110 may perform communications with the network device 120. A link from the network device 120 to the terminal device 110 is referred to as a downlink (DL), while a link from the terminal device 110 to the network device 120 is referred to as an uplink (UL). The terminal device 110 may communicate with the network device 120 using a carrier, which may be indicated by the bidirectional arrow in FIG. 1.

Although the terminal device 110 and the network device 120 are described in the communication environment 100 of FIG. 1, embodiments of the present disclosure may equally apply to any other suitable communication devices in communication with one another. That is, embodiments of the present disclosure are not limited to the exemplary scenarios of FIG. 1. In this regard, it is noted that although the terminal device is schematically depicted as a mobile phone and the network device 120 is schematically depicted as a satellite in FIG. 1, it is understood that these depictions are exemplary in nature without suggesting any limitation. In other embodiments, the terminal device 110 and the network device 120 may be any other communication devices, for example, any other wireless communication devices.

It is to be understood that the particular number of various communication devices and the particular number of various communication links as shown in FIG. 1 is for illustration purpose only without suggesting any limitations. The communication environment 100 may include any suitable number of communication devices and any suitable number of communication links for implementing embodiments of the present disclosure. In addition, it should be appreciated that there may be various wireless as well as wireline communications (if needed) among all of the communication devices.

Figure 2:
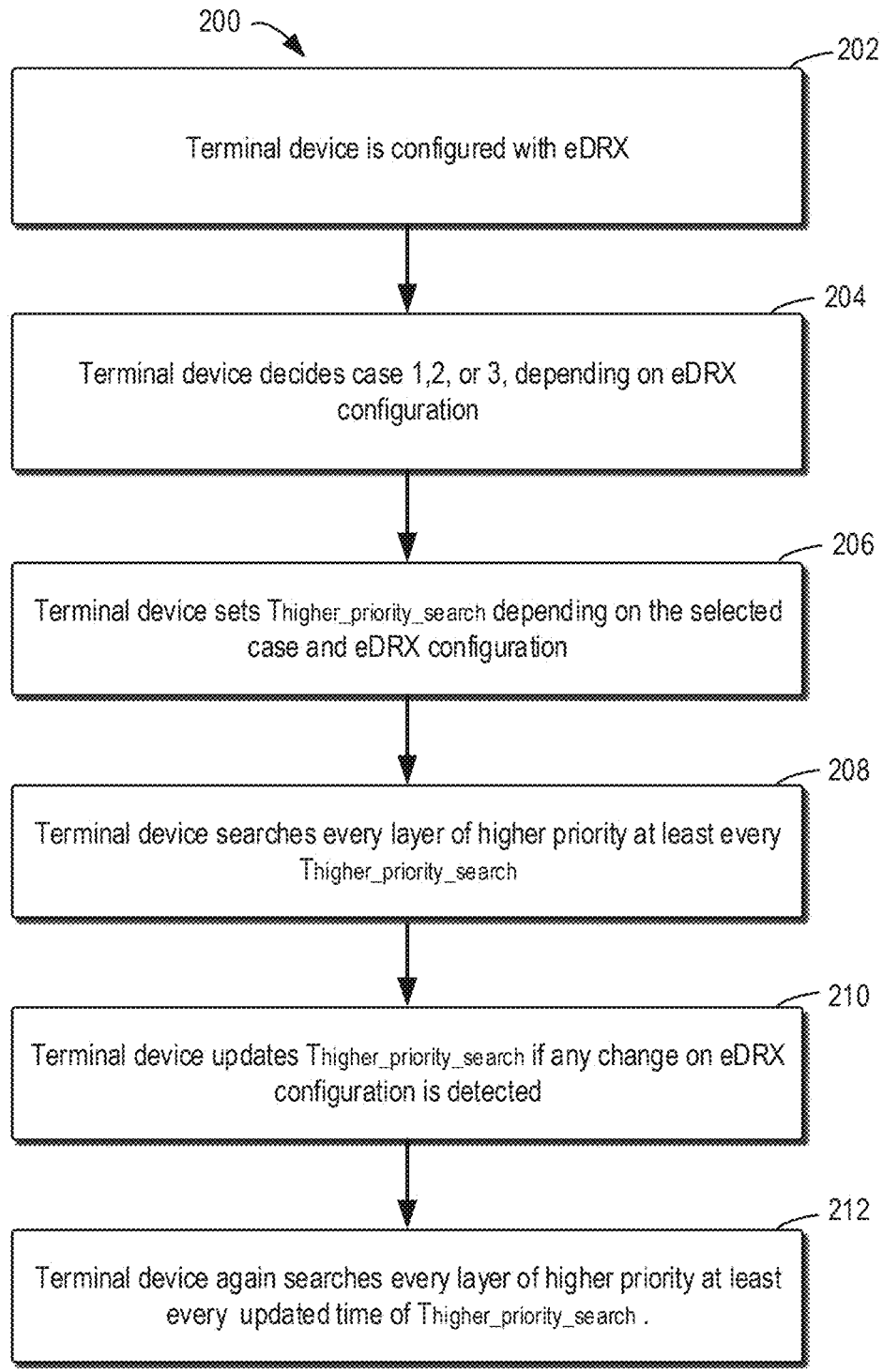
FIG. 2 illustrates a flow chart of method according to some embodiments of the present disclosure.

FIG. 2 illustrates a flowchart of method 200 according to some embodiments of the present disclosure. For the purpose of discussion, the method 200 will be described with reference to FIG. 1. It would be appreciated that although the method 200 has been described referring to FIG. 1, this method 200 may be likewise applied to other similar communication scenarios.

In the method 200, at block 202, the terminal device 110 is configured with Extended Discontinuous Reception (eDRX). The terminal device 110 may be a RedCap UE. In some embodiments, the terminal device 100 may receive a first parameter (e.g., the eDRX cycle) for the terminal device, wherein a first carrier is used by the terminal device 110. The terminal device 100 may receive the first parameter (e.g., the eDRX cycle) from the network device 120.

In some embodiments, the first parameter is determined by the network device 120 based on at least a first value relating to an idle mode of the terminal device 110 and/or a second value relating to an inactive mode of the terminal device 110. In some embodiments, the first parameter has the first value or the second value. For example, the eDRX cycle can be defined as eDRX_IDLE cycle length (e.g., the first value) or eDRX_INACTIVE cycle length (e.g., the second value) if either one of eDRX_IDLE and eDRX_INACTIVE cycles is configured, or if both eDRX_IDLE and eDRX_INACTIVE cycles are configured to UE. eDRX_IDLE may be a higher layer parameter (e.g., a MAC layer parameter) configured for RRC_IDLE terminal devices. eDRX_INACTIVE may be a higher layer parameter (e.g., a MAC layer parameter) configured for RRC_INACTIVE terminal devices.

In some embodiments, when both eDRX_IDLE cycle and eDRX_INACTIVE cycle are configured to UE, eDRX cycle can be given as an output of one of the following functions or any functions, mathematical or data mapping techniques, or algorithms that effectively have an equivalent output as:
  a minimum value of the first value and the second value;
  a maximum value of the first value and the second value;
  an average value of the first value and the second value;
  a median value of the first value and the second value; or
  a least common multiple value of the first value and the second value.

Here the aforementioned functions may receive two inputs such as eDRX_IDLE cycle length (e.g., the first value) and eDRX_INACTIVE cycle length (e.g., the second value).

In the method 200, at block 204, the terminal device 110 decides case 1, 2, or 3, depending on eDRX configuration. In some embodiments, the terminal device 110 may perform a comparison between the first parameter (e.g., the eDRX cycle) and one or more thresholds to decide case 1, 2, or 3, which will be described with more details below.

In the method 200, at block 206, the terminal device 110 sets a second parameter (e.g., $T_{higher\_priority\_search}$) depending on the selected case and eDRX configuration, which will be described with more details below. In some embodiments, the terminal device 110 may determine the second parameter for the terminal device based on the comparison. The second parameter may indicate a time interval for the terminal device to search for one or more carriers with a priority higher than the first carrier. The priority information of the carriers or information of higher priority carriers is already determined and given by the network.

In some embodiments, depending on the configured eDRX cycle parameter value, the terminal device 110 is expected to perform a different higher priority search depending on the configured eDRX cycle value. For example, the terminal device 110 may perform high priority carrier search according to LTE specification, NR specification or a modified version, depending on the eDRX cycle.

In some embodiments, in case 1, when the terminal device 110 is configured with eDRX cycle≤X1, the terminal device 110 may search every layer of higher priority at least every $T_{higher\_priority\_search}$=MAX $(60 \times N_{layers}, A \times eDRX\ cycle)$ seconds, which means $T_{higher\_priority\_search}$ is a maximum value of $60 \times N_{layers}$ seconds and $A \times eDRX$ cycle seconds, wherein $N_{layers}$ is a total number of higher priority NR and E-UTRA carrier frequencies broadcasted in system information, and A is a positive integer. In one example, X1=10.24 seconds. A may be configured and provided by the network device 120.

In some embodiments, in case 2, when the terminal device 110 is configured with X1<eDRX cycle≤X2, the terminal device 110 may search every layer of higher priority at least every $T_{higher\_priority\_search}$=MAX $(60, A \times eDRX\ cycle)$ $N_{layers}$ seconds, which means $T_{higher\_priority\_search}$ is a maximum value of $60 \times N_{layers}$ seconds and $A \times eDRX$ cycle$\times N_{layers}$ seconds, wherein $N_{layers}$ is a total number of higher priority NR and E-UTRA carrier frequencies broadcasted in system information, and A is a positive integer. In one example, A=1. In another example, A may be configured and provided by the network device 120. In some examples, A is specific to the terminal device 110, and the network device 120 indicates the value of A to the terminal device 110. In some examples, A can be a value generally applied or applicable to a specific type of terminal devices (e.g., Rel-17 RedCap UE, or Rel-18 RedCap UE, or any RedCap UE). The value of A can be broadcast to all terminal devices by the network device 120 or multicast to targeting terminal devices.

In some embodiments, in case 2, X1=10.24 seconds and X2 is one of the possible eDRX cycle length duration values greater than 10.24 seconds. For example, 20.48≤X2≤10485.76 seconds. In another example, X1=10.24 seconds, and X2 is configured by the network device 120. In another example, both X1 and X2 can be configured and provided by the network device 120.

In some embodiments, in case 2, X1 and X2 are specific to the terminal device 110, and the network device 120 indicates the values of X1 and X2 to the terminal device 110. In another example, X1 and X2 can be generally applied or applicable to a specific type of terminal devices (e.g., Rel-17 RedCap UE, or Rel-18 RedCap UE, or any RedCap UE). The values of X1 and X2 can be broadcast to all terminal devices on the network or multicast to targeting terminal devices.

In some embodiments, in case 2, the network device 120 can set X1=0 and X2=163.84 seconds or X1=10.24 seconds and X2=163.84 seconds when the terminal device 110 or UE 110 satisfies at least one of the following relaxed measurement criterions:
  Measurements for UE fulfilling stationary criterion
  Measurements for a UE fulfilling not-at-cell edge while stationary criterion
  Measurements for a UE fulfilling stationary and not-at-cell-edge criterion
  Measurements for a UE fulfilling low mobility and stationary criteria
  Measurements for a UE fulfilling low mobility and not-at-cell-edge while stationary criteria
  Measurements for a UE fulfilling not-at-cell edge and not-at-cell edge while stationary criteria
  Measurements for a UE fulfilling low mobility and not-at-cell edge criteria and not-at-cell-edge while stationary criteria
  Measurements for a UE fulfilling low mobility, not-at-cell edge and stationary criterion
  Measurements for UE fulfilling low mobility criterion
  Measurements for UE fulfilling not-at-cell edge criterion
  Measurements for UE fulfilling low mobility and not-at-cell edge criterion In some embodiments, in case 2, the network device 120 can set X2 to infinity or a value greater than the maximum configurable eDRX cycle. In these embodiments, effectively only X1 is used.

In some embodiments, in case 3, when the terminal device 110 is configured with eDRX cycle>X2, the terminal device 110 may search every layer of higher priority at least every $T_{higher\_priority\_search}$=MAX $(60 \times N_{layers}, A \times eDRX\ cycle)$ seconds, which means $T_{higher\_priority\_search}$ is a maximum value of $60 \times N_{layers}$ seconds and $A \times eDRX$ cycle seconds, wherein $N_{layers}$ is a total number of higher priority NR and E-UTRA carrier frequencies broadcasted in system information, and A is a positive integer. In one example, A=1. In another example, A may be configured and provided by the network device 120. In some examples, A is specific to the terminal device 110, and the network device 120 indicates the value of A to the terminal device 110. In some examples, A can be a value generally applied or applicable to a specific type of terminal devices (e.g., Rel-17 RedCap UE, or Rel-18 RedCap UE, or any RedCap UE). The value of A can be broadcast to all terminal devices by the network device 120 or multicast to targeting terminal devices.

In some embodiments, in case 3, X2 is one of the possible eDRX cycle length duration values greater than 10.24 seconds. For example, 20.48≤X2≤10485.76 seconds. X2 can be configured and provided by the network device 120. X2 can be specific to the terminal device 110, and the network device 120 indicates the value of X2 to the terminal device 110. In another example, X2 can be generally applied or applicable to a specific type of terminal devices (e.g., Rel-17 RedCap UE, or Rel-18 RedCap UE, or any RedCap UE). The value of X2 can be broadcast to all terminal devices on the network or multicast to targeting terminal devices.

In some embodiments, in case 3, the network device 120 can set X2=163.84 seconds when the terminal device 110 or UE 110 satisfies at least one of the following relaxed measurement criterions:
  Measurements for UE fulfilling stationary criterion
  Measurements for a UE fulfilling not-at-cell edge while stationary criterion
  Measurements for a UE fulfilling stationary and not-at-cell-edge criterion
  Measurements for a UE fulfilling low mobility and stationary criteria
  Measurements for a UE fulfilling low mobility and not-at-cell-edge while stationary criteria
  Measurements for a UE fulfilling not-at-cell edge and not-at-cell edge while stationary criteria Measurements for a UE fulfilling low mobility and not-at-cell edge criteria and not-at-cell-edge while stationary criteria Measurements for a UE fulfilling low mobility, not-at-cell edge and stationary criterion Measurements for UE fulfilling low mobility criterion Measurements for UE fulfilling not-at-cell edge criterion Measurements for UE fulfilling low mobility and not-at-cell edge criterion In some embodiments, in case 3, the network device 120 can set X2 to infinity or a value greater than the maximum configurable eDRX cycle. In these embodiments, case 3 is not applied.

In some embodiments, the one or more thresholds are predefined and include a first threshold (e.g., X1) and a second threshold (e.g., X2). In some embodiments, the one or more thresholds are configured by the network device 120 and an indication of the one or more thresholds is transmitted from the network device 120 to the terminal device 110.

Referring back to FIG. 2, at block 208, after the case 1, 2 or 3 is determined as described above, the terminal device 110 can search every layer of higher priority at least every $T_{higher\_priority\_search}$ seconds. Each layer may correspond to a carrier. At block 210, the terminal device 110 can update $T_{higher\_priority\_search}$ upon detecting a change of the eDRX cycle. At block 212, the terminal device 110 can again search every layer of higher priority at least every updated time of $T_{higher\_priority\_search}$.

In some embodiments, the network device 120 can perform the process as described above in a similar way. The network device 120 may determine a first parameter (e.g., eDRX cycle) for the terminal device 110, wherein a first carrier is used by the terminal device 110. The network device 120 may perform a comparison between the first parameter and one or more thresholds (e.g., X1 and X2). The network device 120 may determine a second parameter (e.g., $T_{higher\_priority\_search}$) for the terminal device based on the comparison. The second parameter may indicate a time interval for the terminal device to search for one or more carriers with a priority higher than the first carrier.

In some embodiments, the network device 120 may determine the first parameter (e.g., eDRX cycle) for the terminal device 110 based on the eDRX_IDLE cycle length (e.g., the first value) and eDRX_INACTIVE cycle length (e.g., the second value) as described above. In some embodiments, the network device 120 may determine the eDRX_IDLE cycle length (e.g., the first value) and eDRX_INACTIVE cycle length (e.g., the second value) and transmit the first value and/or the second value to the terminal device 110.

In some embodiments, the network device 120 may configure or determine the one or more thresholds (e.g., X1 and X2). In some embodiments, the network device 120 may transmit the first parameter (e.g., eDRX cycle) to the terminal device 110.

By adjusting $T_{higher\_priority\_search}$ based on case 1, 2 or 3 as described above, the present disclosure can provide a better tradeoff between the performance of the network and power and energy consumption of the terminal device such as a RedCap UE. Case 1 provides more benefits for the performance of the network by allowing the terminal device to search for higher priority carriers more frequently. Case 2 provides more benefits for power and energy consumption of the terminal device by allowing the terminal device to search for higher priority carriers at an extended time interval. For case 3, eDRX cycle may be too large, so the $T_{higher\_priority\_search}$ is set the same value as in case 1 to avoid that the terminal device searches for higher priority carriers at a too long time interval, which may impact the performance of the network.

In some embodiments, an apparatus capable of performing the method 200 (for example, the terminal device 110) may comprise means for performing the respective steps of the method 200. The means may be implemented in any suitable form. For example, the means may be implemented in a circuitry or software module.

Figure 3:
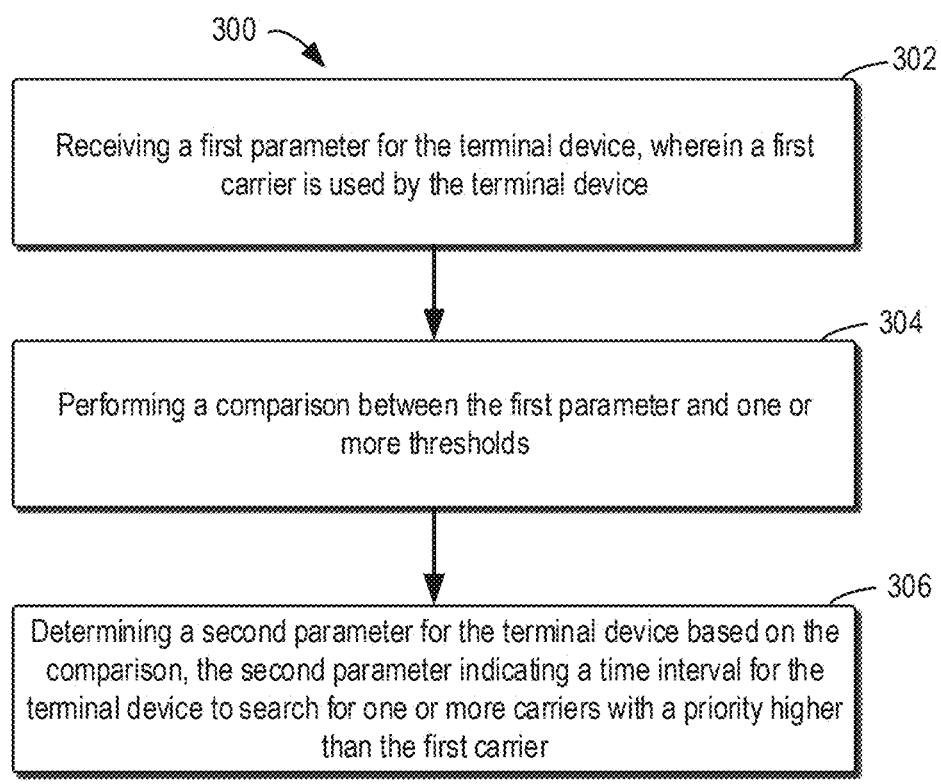
FIG. 3 illustrates a flow chart of method according to some embodiments of the present disclosure.

FIG. 3 illustrates a flowchart of method 300 according to some embodiments of the present disclosure. At block 302, the method comprises receiving a first parameter for a terminal device, wherein a first carrier is used by the terminal device. At block 304, the method comprises performing a comparison between the first parameter and one or more thresholds. At block 306, the method comprises determining a second parameter for the terminal device based on the comparison, the second parameter indicating a time interval for the terminal device to search for one or more carriers with a priority higher than the first carrier. The method 300 may be implemented by the terminal device 110.

In some embodiments, an apparatus capable of performing the method 300 (for example, the terminal device 110) may comprise means for performing the respective steps of the method 300. The means may be implemented in any suitable form. For example, the means may be implemented in a circuitry or software module.

In some embodiments, the apparatus comprises means for receiving a first parameter for a terminal device, wherein a first carrier is used by the terminal device; means for performing a comparison between the first parameter and one or more thresholds; and means for determining a second parameter for the terminal device based on the comparison. The second parameter indicates a time interval for the terminal device to search for one or more carriers with a priority higher than the first carrier.

Figure 4:
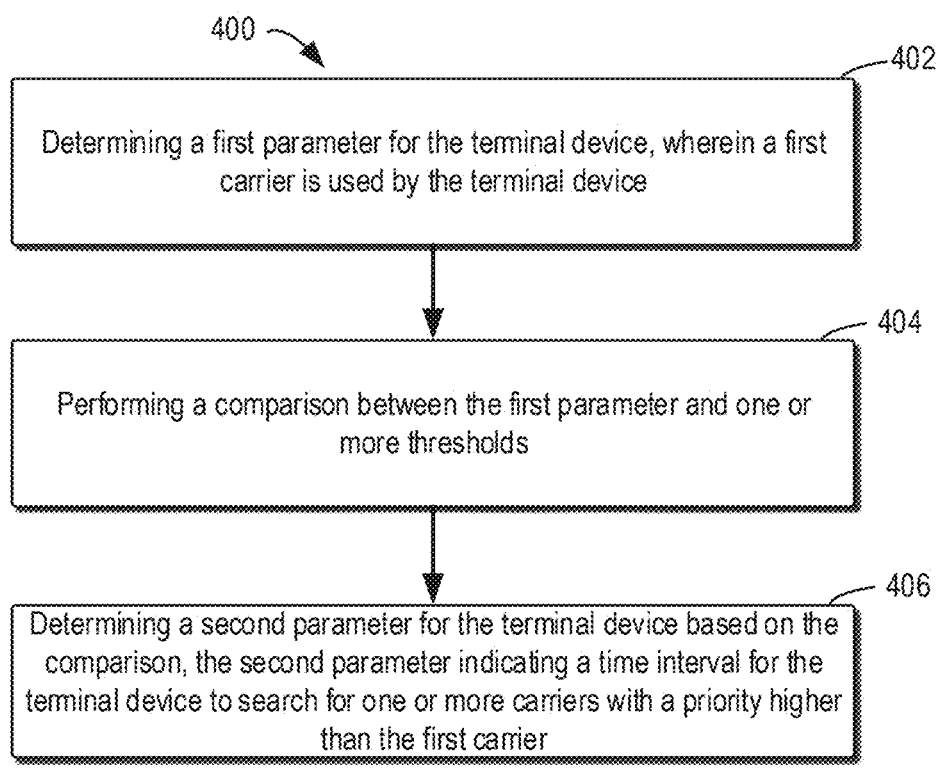
FIG. 4 illustrates a flow chart of method according to some embodiments of the present disclosure.

FIG. 4 illustrates a flowchart of method 400 according to some embodiments of the present disclosure. At block 402, the method comprises determining a first parameter for a terminal device, wherein a first carrier is used by the terminal device. At block 404, the method comprises performing a comparison between the first parameter and one or more thresholds. At block 406, the method comprises determining a second parameter for the terminal device based on the comparison, the second parameter indicating a time interval for the terminal device to search for one or more carriers with a priority higher than the first carrier. The method 400 may be implemented by the terminal device 120.

In some embodiments, an apparatus capable of performing the method 400 (for example, the network device 120) may comprise means for performing the respective steps of the method 400. The means may be implemented in any suitable form. For example, the means may be implemented in a circuitry or software module.

In some embodiments, the apparatus comprises means for determining a first parameter for a terminal device, wherein a first carrier is used by the terminal device; means for performing a comparison between the first parameter and one or more thresholds; and means for determining a second parameter for the terminal device based on the comparison. The second parameter indicates a time interval for the terminal device to search for one or more carriers with a priority higher than the first carrier.

Figure 5:
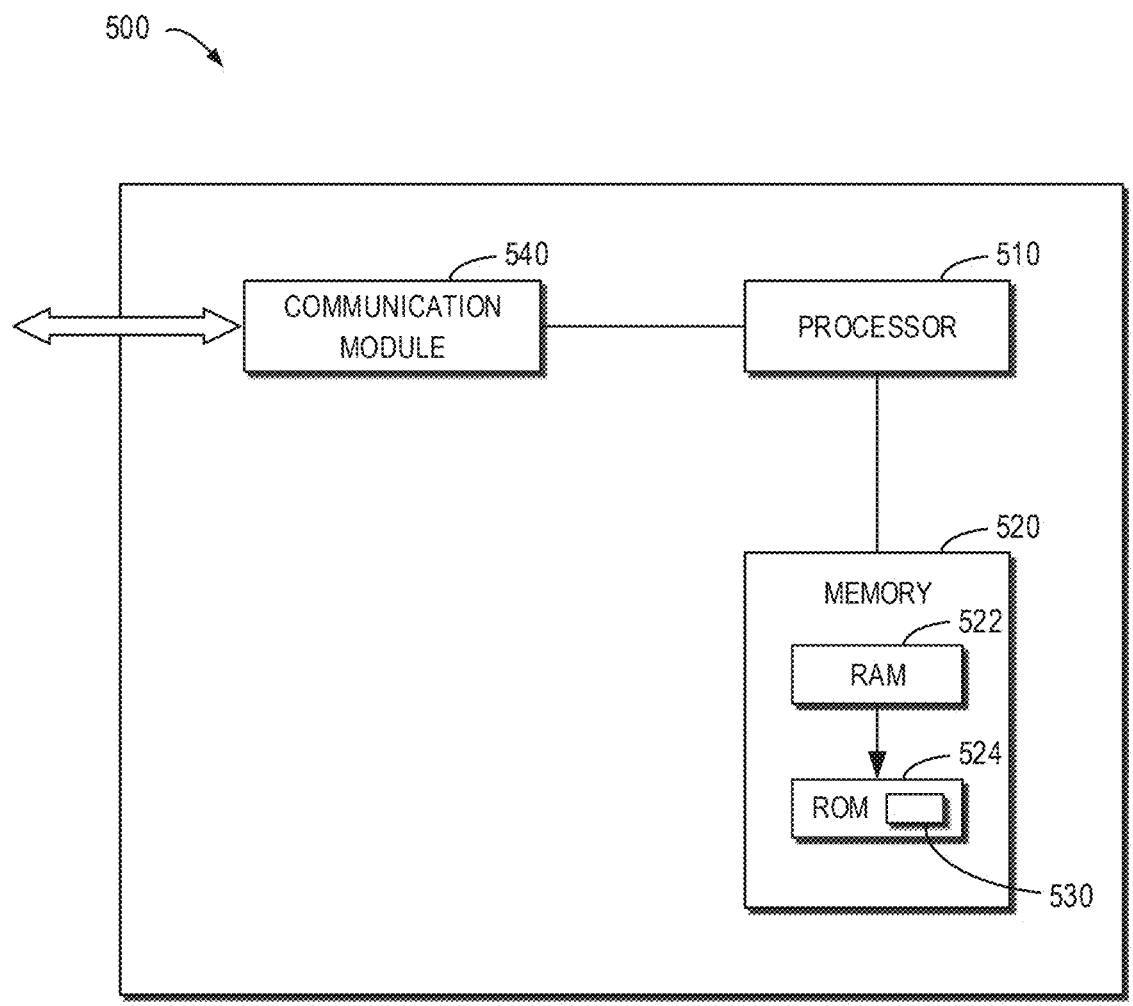
FIG. 5 illustrates a simplified block diagram of a device that is suitable for implementing some example embodiments of the present disclosure.

FIG. 5 illustrates a simplified block diagram of a device 500 that is suitable for implementing some example embodiments of the present disclosure. The device 500 may be provided to implement a communication device, for example, the terminal device 110 and the network device 120 as shown in FIG. 1. As shown, the device 500 includes one or more processors 510, one or more memories 520 coupled to the processor 510, and one or more communication modules 540 coupled to the processor 510.

The communication module 540 is for bidirectional communications. The communication module 540 has at least one antenna to facilitate communication. The communication interface may represent any interface that is necessary for communication with other network elements.

The processor 510 may be of any type suitable to the local technical network and may include one or more of the following: general purpose computers, special purpose computers, microprocessors, digital signal processors (DSPs) and processors based on multicore processor architecture, as non-limiting examples. The device 300 may have multiple processors, such as an application specific integrated circuit chip that is slaved in time to a clock which synchronizes the main processor.

The memory 520 may include one or more non-volatile memories and one or more volatile memories. Examples of the non-volatile memories include, but are not limited to, a Read Only Memory (ROM) 524, an electrically programmable read only memory (EPROM), a flash memory, a hard disk, a compact disc (CD), a digital video disk (DVD), and other magnetic storage and/or optical storage. Examples of the volatile memories include, but are not limited to, a random access memory (RAM) 522 and other volatile memories that will not last in the power-down duration.

A computer program 530 includes computer executable instructions that are executed by the associated processor 510. The program 530 may be stored in the ROM 524. The processor 510 may perform any suitable actions and processing by loading the program 530 into the RAM 522.

The embodiments of the present disclosure may be implemented by means of the program 530 so that the device 500 may perform any process of the disclosure as discussed with reference to FIG. 2. The embodiments of the present disclosure may also be implemented by hardware or by a combination of software and hardware.

In some example embodiments, the program 530 may be tangibly contained in a computer readable medium which may be included in the device 500 (such as in the memory 520) or other storage devices that are accessible by the device 500. The device 500 may load the program 530 from the computer readable medium to the RAM 522 for execution. The computer readable medium may include any types of tangible non-volatile storage, such as ROM, EPROM, a flash memory, a hard disk, CD, DVD, and the like.

Figure 6:
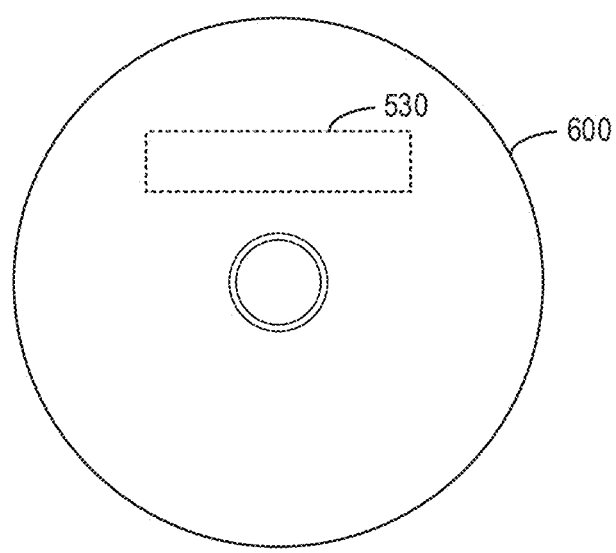
FIG. 6 illustrates a block diagram of an example of a computer readable medium in accordance with some example embodiments of the present disclosure.

FIG. 6 illustrates a block diagram of an example of a computer readable medium 600 in accordance with some example embodiments of the present disclosure. The computer readable medium 600 has the program 530 stored thereon. It is noted that although the computer readable medium 600 is depicted in form of CD or DVD in FIG. 6, the computer readable medium 600 may be in any other form suitable for carry or hold the program 530.

Generally, various embodiments of the present disclosure may be implemented in hardware or special purpose circuits, software, logic or any combination thereof. Some aspects may be implemented in hardware, while other aspects may be implemented in firmware or software which may be executed by a controller, microprocessor or other computing device. While various aspects of embodiments of the present disclosure are illustrated and described as block diagrams, flowcharts, or using some other pictorial representations, it is to be understood that the block, apparatus, system, technique or method described herein may be implemented in, as non-limiting examples, hardware, software, firmware, special purpose circuits or logic, general purpose hardware or controller or other computing devices, or some combination thereof.

The present disclosure also provides at least one computer program product tangibly stored on a non-transitory computer readable storage medium. The computer program product includes computer-executable instructions, such as those included in program modules, being executed in a device on a target real or virtual processor, to carry out the method 300 or 400 as described above with reference to FIG. 3 or 4. Generally, program modules include routines, programs, libraries, objects, classes, components, data structures, or the like that perform particular tasks or implement particular abstract data types. The functionality of the program modules may be combined or split between program modules as desired in various embodiments. Machine-executable instructions for program modules may be executed within a local or distributed device. In a distributed device, program modules may be located in both local and remote storage media.

Program code for carrying out methods of the present disclosure may be written in any combination of one or more programming languages. These program codes may be provided to a processor or controller of a general purpose computer, special purpose computer, or other programmable data processing apparatus, such that the program codes, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

In the context of the present disclosure, the computer program codes or related data may be carried by any suitable carrier to enable the device, apparatus or processor to perform various processes and operations as described above. Examples of the carrier include a signal, computer readable medium, and the like.

The computer readable medium may be a computer readable signal medium or a computer readable storage medium. A computer readable medium may include but not limited to an electronic, magnetic, optical, electromagnetic, infrared, or semiconductor system, apparatus, or device, or any suitable combination of the foregoing. More specific examples of the computer readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. The term "non-transitory," as used herein, is a limitation of the medium itself (i.e., tangible, not a signal) as opposed to a limitation on data storage persistency (e.g., RAM vs. ROM).

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the present disclosure, but rather as descriptions of features that may be specific to particular embodiments. Certain features that are described in the context of separate embodiments may also be implemented in combination in a single embodiment. Conversely, various features that are described in the context of a single embodiment may also be implemented in multiple embodiments separately or in any suitable sub-combination.

Although the present disclosure has been described in languages specific to structural features and/or methodological acts, it is to be understood that the present disclosure defined in the appended claims is not necessarily limited to the specific features or acts described above. Rather, the specific features and acts described above are disclosed as example forms of implementing the claims.

What is claimed is:

1. A terminal device, comprising:
    at least one processor; and
    at least one memory storing instructions that, when executed with the at least one processor, cause the terminal device to at least:
    receive a first parameter for the terminal device, wherein a first carrier is used with the terminal device;
    perform a comparison between the first parameter and one or more thresholds, wherein the one or more thresholds are predefined and include a first threshold and a second threshold;
    determine a second parameter for the terminal device based on the comparison, the second parameter indicating a time interval for the terminal device to search for one or more carriers with a priority higher than the first carrier, and
    in case the first parameter is less than or equal to the first threshold, determine the second parameter as a maximum value of $60 \times N_{layers}$ seconds and A×the first parameter seconds, wherein $N_{layers}$ is a total number of the one or more carriers, and A is a positive integer received from a network device, and
    in case the first parameter is larger than the first threshold and less than or equal to the second threshold, determine the second parameter as a maximum value of $60 \times N_{layers}$ seconds and A×the first parameter×$N_{layers}$ seconds.

2. The terminal device of claim 1, wherein the first parameter is determined by a network device based on at least one of a first value relating to an idle mode of the terminal device or a second value relating to an inactive mode of the terminal device.

3. The terminal device of claim 2, wherein the first parameter has the first value or the second value.

4. The terminal device of claim 2, wherein the first parameter has one of the following:
    a minimum value of the first value and the second value;
    a maximum value of the first value and the second value;
    an average value of the first value and the second value;
    a median value of the first value and the second value; or
    a least common multiple value of the first value and the second value.

5. The terminal device of claim 1, wherein the instructions, when executed with the at least one processor, cause the terminal device to:
    in case the first parameter is larger than the second threshold, determine the second parameter as a maximum value of:
        $60 \times N_{layers}$ seconds, and
        A×the first parameter seconds.

6. The terminal device of claim 1, wherein the first threshold and the second threshold are specific to the terminal device or are applicable to a type of terminal devices.

7. The terminal device of claim 1, wherein the one or more thresholds are configured by a network device and the instructions, when executed with the at least one processor, cause the terminal device to receive an indication of the one or more thresholds, wherein the one or more thresholds include a first threshold and a second threshold.

8. The terminal device of claim 1, wherein the instructions, when executed with the at least one processor, cause the terminal device to update the second parameter in response to detecting a change of the first parameter.

9. A method, comprising:
    receiving a first parameter for a terminal device, wherein a first carrier is used with the terminal device;
    performing a comparison between the first parameter and one or more thresholds, wherein the one or more thresholds are predefined and include a first threshold and a second threshold;
    determining a second parameter for the terminal device based on the comparison, the second parameter indicating a time interval for the terminal device to search for one or more carriers with a priority higher than the first carrier; and
    in case the first parameter is less than or equal to the first threshold, determining the second parameter as a maximum value of: $60 \times N_{layers}$ seconds, and A×the first parameter seconds, wherein $N_{layers}$ is a total number of the one or more carriers and A is a positive integer received from a network device, and
    in case the first parameter is larger than the first threshold and less than or equal to the second threshold, determine the second parameter as a maximum value of $60 \times N_{layers}$ seconds and A×the first parameter×$N_{layers}$ seconds.

10. The method of claim 9, wherein the first parameter is determined by the network device based on at least one of a first value relating to an idle mode of the terminal device or a second value relating to an inactive mode of the terminal device.

11. The method of claim 10, wherein the first parameter has the first value or the second value.

12. The method of claim 10, wherein the first parameter has one of the following:
    a minimum value of the first value and the second value;
    a maximum value of the first value and the second value;
    an average value of the first value and the second value;
    a median value of the first value and the second value; or
    a least common multiple value of the first value and the second value.

13. The method of claim 9, wherein the one or more thresholds are configured by a network device and an indication of the one or more thresholds is received with the terminal device, wherein the one or more thresholds include a first threshold and a second threshold.

14. The method of claim 9, further comprising:
    in case the first parameter is larger than the second threshold, determining the second parameter as a maximum value of:
        $60 \times N_{layers}$ seconds, and
        A×the first parameter seconds.

15. The method of claim 9, further comprising updating the second parameter in response to detecting a change of the first parameter.

16. A non-transitory computer-readable medium comprising program instructions for causing an apparatus to perform:
- receiving a first parameter for a terminal device, wherein a first carrier is used with the terminal device;
- performing a comparison between the first parameter and one or more thresholds, wherein the one or more thresholds are predefined and include a first threshold and a second threshold;
- determining a second parameter for the terminal device based on the comparison, the second parameter indicating a time interval for the terminal device to search for one or more carriers with a priority higher than the first carrier; and
- in case the first parameter is less than or equal to the first threshold, determining the second parameter as a maximum value of: $60 \times N_{layers}$ seconds, and A×the first parameter seconds, wherein $N_{layers}$ is a total number of the one or more carriers and A is a positive integer received from a network device, and
- in case the first parameter is larger than the first threshold and less than or equal to the second threshold, determine the second parameter as a maximum value of $60 \times N_{layers}$ seconds and A×the first parameter×$N_{layers}$ seconds.

* * * * *